E. G. WOODY.
CONDIMENT SHAKER.
APPLICATION FILED OCT. 2, 1917.
1,251,160.
Patented Dec. 25, 1917.
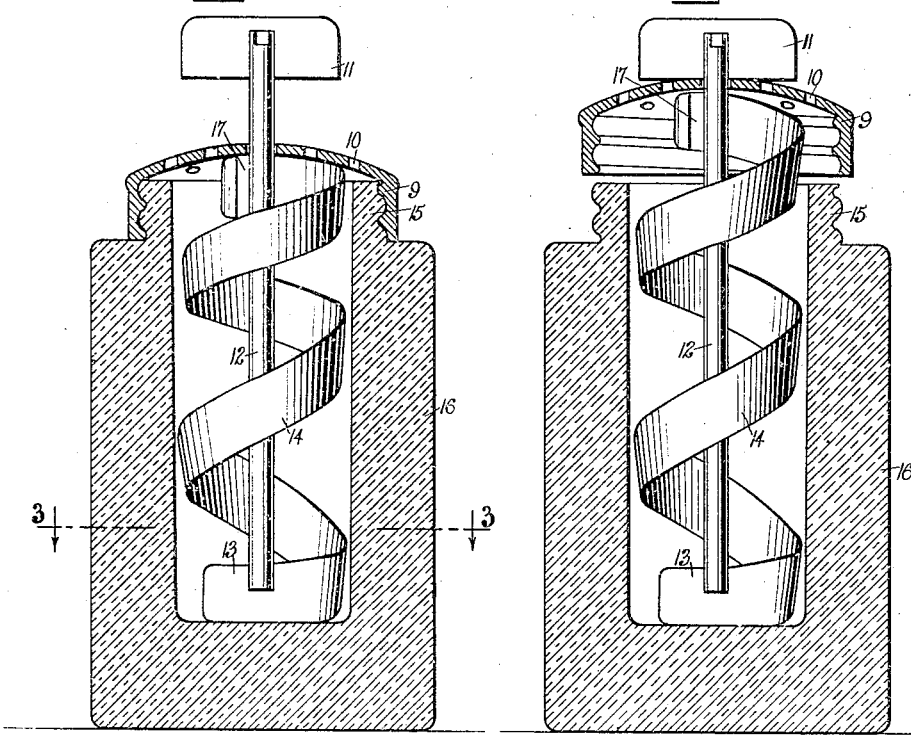
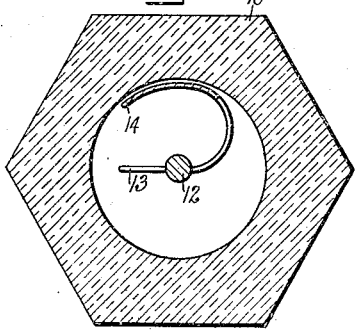
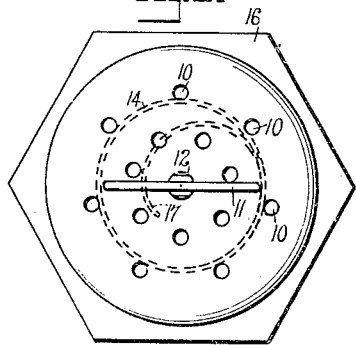
WITNESSES
INVENTOR
E. G. Woody
BY
ATTORNEYS

UNITED STATES PATENT OFFICE.

EDWARD GRAHAM WOODY, OF WILMINGTON, NORTH CAROLINA.

CONDIMENT-SHAKER.

1,251,160.  Specification of Letters Patent.  Patented Dec. 25, 1917.

Application filed October 2, 1917.  Serial No. 194,375.

*To all whom it may concern:*

Be it known that I, EDWARD G. WOODY, a citizen of the United States, and a resident of Wilmington, in the county of New Hanover and State of North Carolina, have invented a new and Improved Condiment-Shaker, of which the following is a full, clear, and exact description.

Among the principal objects which the present invention has in view are: To extract the moistened contents of a deliquescent material from the container provided therefor; to mechanically comminute the material when extracting the same; to assist in drying the material; and to simplify and cheapen the construction of the apparatus.

Drawings.

Figure 1 is a vertical section of a salt cellar constructed and arranged in accordance with the present invention, the top of the salt cellar and the ejector for removing the contents both being shown in service relation;

Fig. 2 is a similar view, the top and the ejector being shown out of their service relation;

Fig. 3 is a cross section, said section being taken as on the line 3—3 in Fig. 1;

Fig. 4 is a top view of a salt cellar arranged as shown in Fig. 1.

Description.

It is well known that under certain conditions, condiments, such as sugar and salt, deliquesce or absorb from the atmosphere the moisture present therein. If the condiment be held in a container provided with a sprinkling cover or top, it is difficult to extract the material, the flow of which is impeded by the consistency thereof.

As seen in the drawings, a salt cellar constructed and equipped in accordance with the present invention, has a removable spray top 9 provided with the customary perforations 10. A handle 11 is rigidly mounted at the exposed end of the stem 12. The stem 12 passes through a perforation centrally located in the top 9 and is rigidly connected at the opposite end to the terminal 13 of a conveyer 14. The conveyer 14 is constructed of any suitable material, that preferred being a light steel or other spring metal. The metal of whatever character is used, is treated or coated to avoid the corrosive action of the condiment, such as chlorin, contained in salt, and certain acids present in sugar.

As shown best in Fig. 2 of the drawings, the conveyer 14 is spirally shaped and the convolutions of the spiral are tapered. When relaxed, the conveyer 14 extends longitudinally toward the neck 15 of the salt cellar 16. When the cover 9 is screwed down on the neck 15, the conveyer 14 is longitudinally compressed as seen in Fig. 1 of the drawings.

The terminal 13 of the conveyer 14 has a straight edge which normally rests on the bottom of the containing chamber of the salt cellar 16. When the stem 12 with which the terminal 13 is rigidly connected is rotated, the bottom of the containing chamber is scraped by the said terminal. A like office is performed for the under and inner side of the cover 9 by the flexible terminal 17 of the conveyer 14.

As seen best in Fig. 1 of the drawings, when the cover 9 is screwed down to the service position, the conveyer is contracted lengthwise and the terminal 17 is induced to conform with the shape of the under surface of the top 9. The terminal 17 is designed to scrape the under surface of the top 9 when the conveyer is rotated, so that the jets of the contents forced through the perforations 10, are severed from the body of the contents and induced to fall from the top 9 as relatively small particles or quantities.

In the operation of extracting the contents of the salt cellar, it is obvious that the coils of the conveyer 14 are enlarged by the resistance of the body of the contents. This operation expands the coils until the inclined scraping edges thereof bear against the side of the chamber of the cellar. It is also obvious that this operation is permitted and induced by the fact that the stem 12 is connected with the conveyer 14 adjacent the lower terminal thereof.

It will be noted that if during the operation of extracting the condiment from the cellar, it becomes necessary to break up the mass of the condiment, this may be readily accomplished by raising and lowering the stem 12 by means of the handle 11. It is obvious that this would result in the lateral expansion and contraction of the convolutions of the conveyer, operating thereby to pulverize the condiment against the walls of the chamber.

*Claims.*

1. A shaker as characterized having a perforated sprinkler top, in combination with a conveyer rotatively mounted in said top for extension to the bottom of said shaker, said conveyer being adapted for lateral extension when rotated operatively.

2. A shaker as characterized having a cylindrical containing chamber and a perforated cover therefor, a resilient spiral conveyer mounted in said chamber, said conveyer having a normal length greater than the length of said chamber; and a rotary stem for said conveyer, said stem being rotatively mounted in said cover and rigidly attached to said conveyer adjacent the inner terminal thereof.

3. A shaker as characterized comprising a body portion having a cylindrical containing chamber; a perforated cover for said chamber; a spiral conveyer blade, the convolutions of said conveyer being tapered and the upper convolution of said conveyer being contracted toward the axis of said conveyer to form a scraping member for said cover; a stem rotatively mounted in said cover for extension adjacent the bottom of said chamber; and means rigidly connecting the end of said stem and the lower terminal of said conveyer, for permitting the expanding and contracting of said conveyer longitudinally.

EDWARD GRAHAM WOODY.

Copies of this patent may be obtained for five cents each, by addressing the "Commissioner of Patents, Washington, D. C."